US011704250B2

(12) United States Patent
Moyer (10) Patent No.: US 11,704,250 B2
(45) Date of Patent: Jul. 18, 2023

(54) USING REQUEST CLASS AND REUSE RECORDING IN ONE CACHE FOR INSERTION POLICIES OF ANOTHER CACHE

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/488,206

(22) Filed: Sep. 28, 2021

(65) Prior Publication Data

US 2023/0100230 A1 Mar. 30, 2023

(51) Int. Cl.
*G06F 12/0897* (2016.01)
*G06F 12/02* (2006.01)
*G06F 12/123* (2016.01)
*G06F 12/0864* (2016.01)

(52) U.S. Cl.
CPC ...... *G06F 12/0897* (2013.01); *G06F 12/0246* (2013.01); *G06F 12/0864* (2013.01); *G06F 12/123* (2013.01)

(58) Field of Classification Search
None
See application file for complete search history.

(56) References Cited

U.S. PATENT DOCUMENTS

| | | | |
|---|---|---|---|
| 2013/0151777 A1 | 6/2013 | Daly et al. | |
| 2013/0166846 A1 | 6/2013 | Gaur et al. | |
| 2013/0311724 A1 | 11/2013 | Walker et al. | |
| 2015/0347299 A1 | 12/2015 | Hagersten et al. | |
| 2016/0350227 A1* | 12/2016 | Hooker | G06F 12/0223 |
| 2017/0357588 A1* | 12/2017 | Moyer | G06F 12/0811 |
| 2018/0143911 A1* | 5/2018 | Moyer | G06F 12/123 |
| 2018/0157591 A1* | 6/2018 | Wilkerson | G06F 12/0862 |
| 2018/0165217 A1* | 6/2018 | Greenspan | G06F 12/123 |
| 2022/0413866 A1* | 12/2022 | Nathella | G06F 9/3802 |

FOREIGN PATENT DOCUMENTS

KR  10-2019-0058316 A  5/2019

* cited by examiner

*Primary Examiner* — Stephanie Wu
(74) *Attorney, Agent, or Firm* — Volpe Koenig (57) ABSTRACT

Systems and methods are disclosed for maintaining insertion policies of a lower-level cache. Techniques are described for selecting, based on metadata of an evicted data block received from an upper-level cache, an insertion policy out of the insertion policies. Then, determining, based on the selected insertion policy, whether to insert the data block into the lower-level cache. If it is determined to insert, the data block is inserted into the lower-level cache according to the selected insertion policy. Techniques for dynamically updating the insertion policies of the lower-level cache are also disclosed.

21 Claims, 5 Drawing Sheets

USING REQUEST CLASS AND REUSE RECORDING IN ONE CACHE FOR INSERTION POLICIES OF ANOTHER CACHE

BACKGROUND

In today's multi-core processors, the processors enjoy the benefit of a hierarchy of caches. For example, a processor core may have access to a first level cache that is dedicated to its use. A first level cache is typically small and local to the processor core it serves, and, can therefore be efficiently accessed. In addition, the processor core may have access to a second level cache, and possibly a third level cache, that are used also by other processor cores in the multi-core processor computer. The second level and third level caches are typically larger caches, but being remote to the processor core are less efficient to access. In a multi-level cache architecture, data blocks (i.e., lines) that are evicted from an upper-level cache are considered for insertion into a lower-level cache in the cache hierarchy. Hence, caches that store evicted data blocks, namely victim-filled caches, have insertion policies according to which they determine whether to insert an evicted data block or otherwise to send it to the next-level cache down the hierarchy. Techniques are needed to optimize the insertion policies of victim-filled caches.

BRIEF DESCRIPTION OF THE DRAWINGS

A more detailed understanding can be achieved through the following description given by way of example in conjunction with the accompanying drawings wherein.

DETAILED DESCRIPTION

The present disclosure describes a method of maintaining insertion policies of a lower-level cache. The method comprises receiving, from an upper-level cache, a data block and associated metadata, the metadata include a reused bit and a request class. Then, selecting, based on the reused bit and the request class, an insertion policy of the insertion policies and determining, based on the selected insertion policy, whether to insert the data block into the lower-level cache. If it is determined to insert, inserting the data block into the lower-level cache according to the selected insertion policy. Further, upon insertion, the method can update, based on the metadata, the selected insertion policy. The selected insertion policy can apply a Re-Reference Interval Prediction (RRIP) replacement policy, assigning an RRIP value to the inserted data block. The selected insertion policy can also apply a Least Recently Used (LRU) replacement policy, assigning a recency value to the inserted data block.

In an alternative, the lower-level cache is a set associative cache. In which case, the method further comprises selecting, based on the reused bit and the request class, a first insertion policy candidate and a second insertion policy candidate of the insertion policies. Then determining, based on the first insertion policy candidate, whether to insert the data block into a first group of sets in the lower-level cache, and if it is determined to insert, inserting the data block into the first group according to the first insertion policy candidate. Then further determining, based on the second insertion policy candidate, whether to insert the data block into a second group of sets in the lower-level cache, and if it is determined to insert, inserting the data block into the second group according to the second insertion policy candidate. Based on one of the first or the second candidate policies, the method updates the selected insertion policy. For example, the updating of the selected insertion can comprise: tracking, based on a performance metric, the performance of the first group and the second group; selecting, based on the performance of the first group and the second group, a new insertion policy; and updating the selected insertion policy based on the new insertion policy. In another example, the updating of the selected insertion can comprise: tracking the number of cache misses that occurred in the first group and the second group; and if least number of cache misses occurred in the first group, updating the selected insertion policy based on the first insertion policy candidate.

The present disclosure further discloses a system that comprises at least one processor and memory. The memory store instructions that, when executed by the at least one processor, cause the system to: receive, from an upper-level cache, a data block and associated metadata, the metadata include a reused bit and a request class; select, based on the reused bit and the request class, an insertion policy of the insertion policies; determine, based on the selected insertion policy, whether to insert the data block into the lower-level cache; and if it is determined to insert, insert the data block into the lower-level cache according to the selected insertion policy.

Furthermore, the present disclosure discloses a non-transitory computer-readable medium comprising instructions executable by at least one processor to perform operations. The operations comprising: receiving, from an upper-level cache, a data block and associated metadata, the metadata include a reused bit and a request class; selecting, based on the reused bit and the request class, an insertion policy of the insertion policies; determining, based on the selected insertion policy, whether to insert the data block into the lower-level cache; and if it is determined to insert, inserting the data block into the lower-level cache according to the selected insertion policy.

Figure 1A:
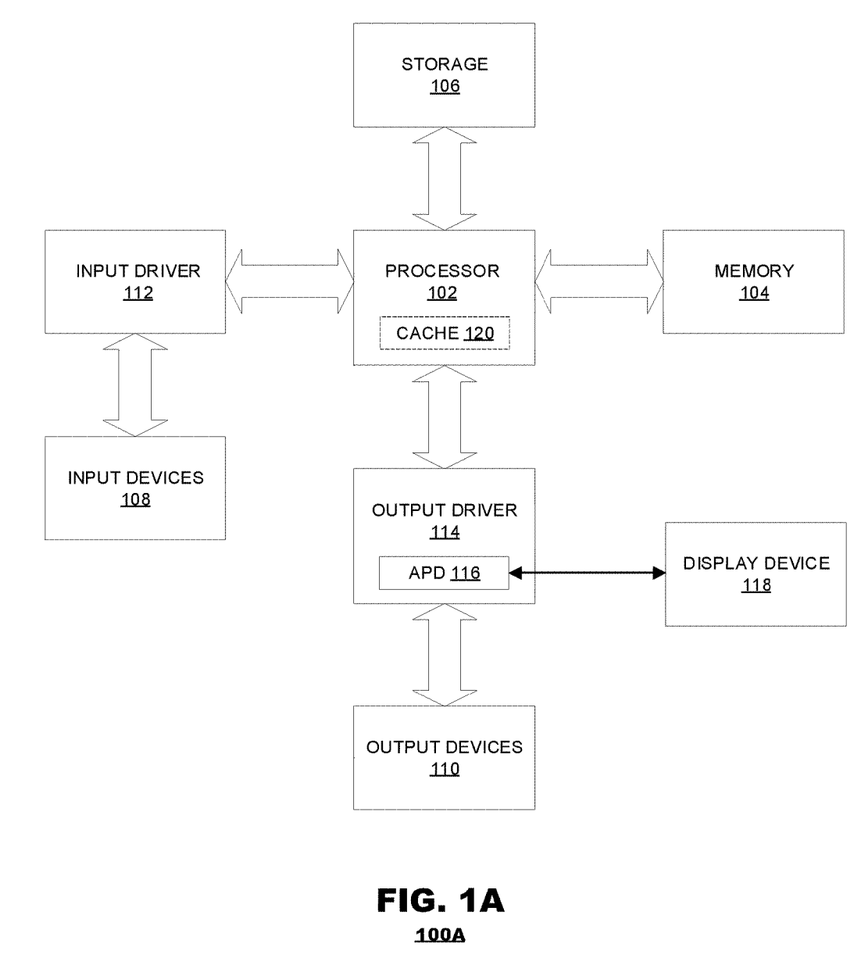
FIG. 1A is a block diagram of an example device in which one or more features of the disclosure can be implemented.

FIG. 1A is a block diagram of an example device 100A in which one or more features of the disclosure can be implemented. The device 100A could be one of, but is not limited to, for example, a computer, a gaming device, a handheld device, a set-top box, a television, a mobile phone, a tablet computer, or other computing device. The device 100A includes a processor 102, a memory 104, a storage 106, one or more input devices 108, and one or more output devices 110. The device 100A also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100A can include additional components not shown in FIG. 1A.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache. In some implementations, the processor 102 includes one or more caches 120. As is generally known, a cache stores data items judged by a cache manager as likely to be accessed by instructions executing on the processor 102 in the near future. The cache 120 represents one or more cache memories of the processor 102. In various implementations, the one or more cache memories are organized into a cache hierarchy, where caches higher in the cache hierarchy service misses from and receive evited cache entries from caches lower in the cache hierarchy.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 1B:
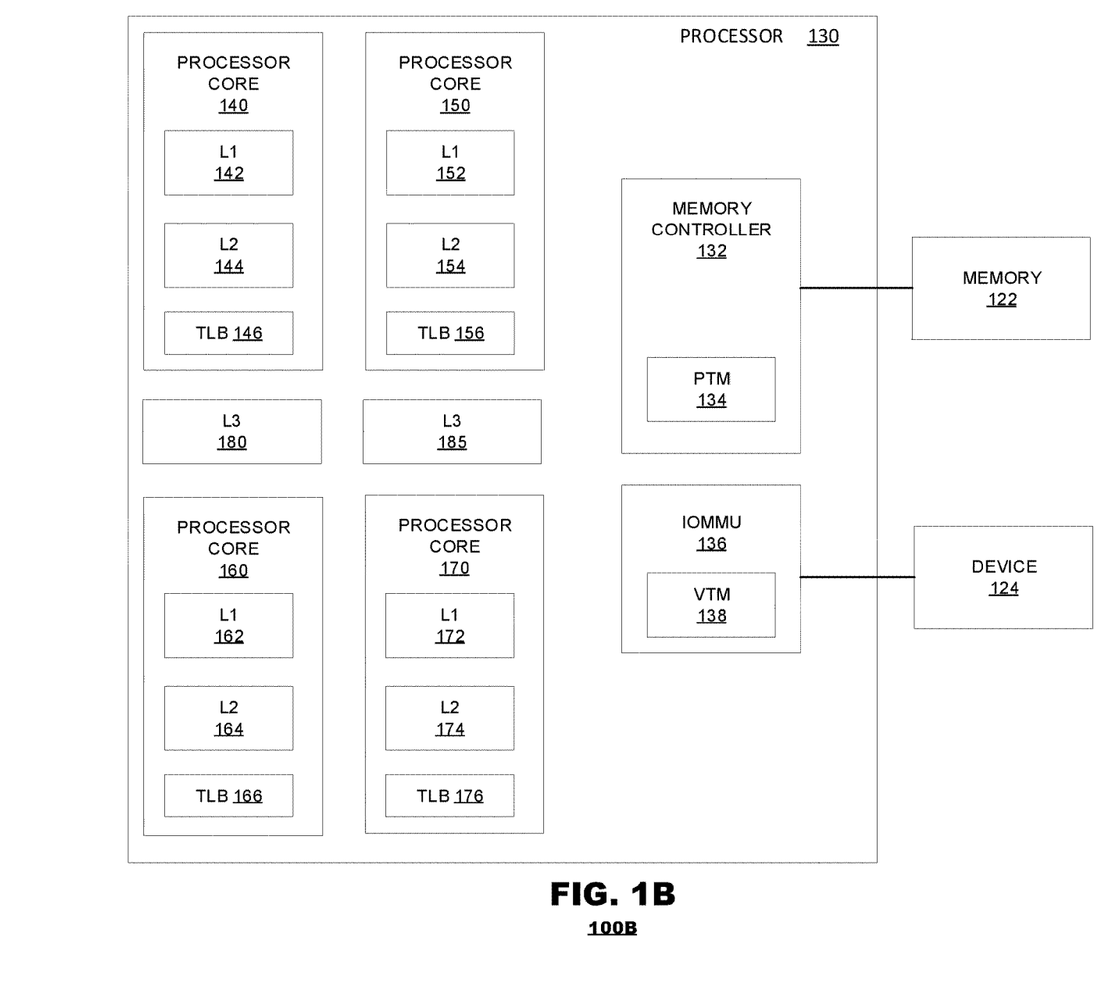
FIG. 1B is a block diagram of an example system that provides for managing memory access requests from devices in which one or more features of the disclosure can be implemented.

FIG. 1B is a block diagram of an example system 100B that provides for managing memory access requests from devices in which one or more features of the disclosure can be implemented. The system 100B includes a processor 130 and a memory 122. The system 100B can be incorporated in any of a variety of electronic devices, such as a server, personal computer, tablet, set top box, gaming system, and the like. The processor 130 is generally configured to execute sets of instructions (e.g., computer programs) that manipulate the circuitry of the processor 130 to carry out defined tasks.

The memory 122 facilitates the execution of these tasks by storing data and instructions used by the processor 130. The memory 122 can be random access memory (RAM), non-volatile memory such as flash memory or a hard disk drive (HDD), and the like, or a combination thereof. The system 100B also includes a device 124, such as a physical input/output (I/O) device. The device 124 can be, for example, a network interface card (NIC), a host bus adapter (HBA), or the like.

The processor 30 also includes processor cores 140, 150, 160, and 170 and a memory controller (e.g., a northbridge) 132. The processor cores 140, 150, 160, and 170 are processing units that individually and concurrently execute instructions. In some embodiments, each of the processor cores 140, 150, 160, and 170 includes an individual instruction pipeline that fetches instructions, decodes the fetched instructions into corresponding operations and, using the resources of the system 100B, executes various operations. While FIG. 1B illustrates a processor 130 with four processor cores 140, 150, 160, and 170, the processor 130 can have more or can have less than four processor cores. Each of the processor cores 140, 150, 160, and 170 has low level cache dedicated to the processor core. For example, the processor core 140 has a Level 1 cache 142 and a Level 2 cache 144. The processor core 140 can also include a translation lookaside buffer 146. Similarly, the processor core 150 has associated Level 1 cache 152 and Level 2 cache 154. The processor core 150 can also include a translation lookaside buffer 156. In a further example, the processor core 160 has a Level 1 cache 162 and a Level 2 cache 164. The processor core 160 can also include a translation lookaside buffer 166. In another example, the processor core 170 has a Level 1 cache 172 and a Level 2 cache 174. The processor core 170 can also include a translation lookaside buffer 176. The processor 130 can further include cache memory shared by pairs of processors. For example, processor core 140 and processor core 160 can share an L3 cache memory 180, and processor core 150 and processor core 170 can share an L3 cache memory 185.

The processor 130 also includes an input/output memory management unit (IOMMU) 136 that is used to connect devices (such as the device 124, e.g., as shown in FIG. 1A) to the memory controller 132. In some embodiments, the IOMMU 136 communicates with device 124 using a serial bus. The serial bus can comply with a bus standard, such as the Peripheral Component Interconnect Express (PCIe) serial bus standard. The memory controller 132 provides an interface for the device 124 to communicate with the memory 122 or with one or more levels of cache memory.

The IOMMU 136 receives memory access requests (e.g., direct memory access requests, such as a cache injection memory access request) from the device 124 and controls provision of those requests to the memory 122 or to cache memory via memory controller 132. The processor 130, for example, at the memory controller 132, includes a physical tag map 134 to map a physical steering tag received from the IOMMU 136 into a physical resource targeted by an associated memory access request, such as a cache injection memory access request. In addition, the memory controller 132 receives responses to memory access requests from the memory 122 or cache memory and controls provision of the responses to the device 124.

The cache injection memory access request can utilize steering tags to target processor resources, such as lower level cache dedicated to a processor core, cache shared between a subset of processor cores, or a share cache. For example, the steering tag can target an L1 cache 152 or L2 cache 154 accessible by processor core 150, an L3 cache 185 accessible to processor cores 150 and 170. Accordingly, to facilitate efficient execution of memory access requests, the IOMMU 136 accesses a virtual tag map to translate virtual steering tags received in a memory access request to physical steering tag mapped to a physical resource. In response to receiving a memory access request from the device 124, the IOMMU 136 identifies a virtual steering tag and translates the virtual steering tag with the virtual tag map 138. The virtual tag map 138 can be stored in system memory 122 and portions may be cached at the IOMMU 136. Alternatively, the virtual tag map 138 can be cached at the IOMMU 136. The IOMMU 136 provides the memory access request and physical steering tag to the memory controller 132. The memory controller 132 translates the physical steering tag to a physical resource targeted by the memory access request, such as lower-level cache targeted by a cache injection memory access request. In an example, the memory access request targets a low-level cache dedicated to a processor core. In such an example, an address associated with the request can be translated by a translation lookaside buffer, and the cache injection memory access executed.

In some embodiments, the device 124 employs the memory controller 132 to access information in the memory 122 or in cache memory through direct memory access (DMA) requests by initiating a memory access request containing a virtual steering tag and a virtual address sent to the IOMMU 136. The IOMMU 136 can perform steering tag remapping between a virtual steering tag and a physical steering tag and address translation between virtual addresses and physical addresses in the memory 122 or cache memory. The steering tag remapping process and the address translation process can be independent functions of the IOMMU and can be performed concurrently. For example, the device 124 generates cache injection memory access requests, including write requests to store data at the cache memory associated with a processor executing a virtual machine having use for the data provided by the device 124. Each memory access request includes a virtual steering tag mapped through an associated physical steering tag to a cache resource (e.g., L3 cache 180 or 185; L1 cache 142, 152, 162, or 172; L2 cache 144, 154, 164, or 174) and a memory address indicating a location at the cache resource targeted by the cache injection memory access request. In response to a write request, the resource stores write information of the request at the location corresponding to the memory address of the write request.

Figure 2:
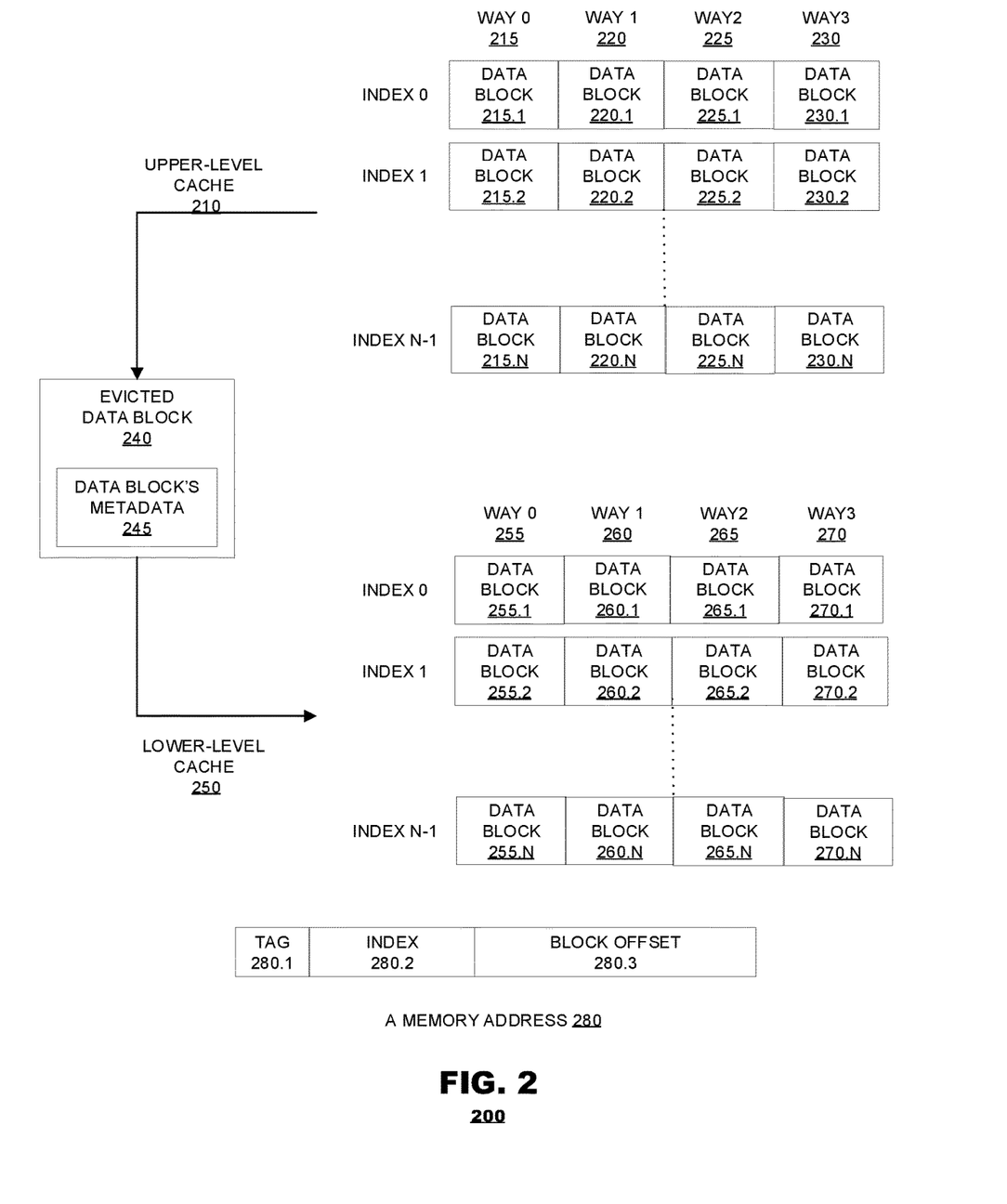
FIG. 2 is a block diagram of an example cache hierarchy, including four-way set associative caches, employable by processors of the device of FIG. 1A, based on which one or more features of the disclosure can be implemented.

FIG. 2 is a block diagram of an example cache hierarchy 200, including four-way set associative caches, employable by processors of the device of FIG. 1A, based on which one or more features of the disclosure can be implemented. FIG. 2 illustrates an upper-level cache 210 that can be situated at a certain level in a cache hierarchy and a lower-level cache 250, i.e., a victim-filled cache, that can be situated at a level below the level of cache 210. Both caches can be L-way set associative caches. For example, as illustrated in FIG. 2, the caches 210, 250, are set associative caches. A four-way set associative cache is partitioned into sets (specified by indexes), each containing four data blocks (or four lines)—e.g., four ways 215, 220, 225, and 230 of the upper-level cache 210 and four ways 255, 260, 265, and 270 of the lower-level cache 250—so that each memory section from the main memory, based on their particular address, can be stored in one of the four ways of one set.

For example, a memory address 280 (of a particular memory section in the main memory) is shown to include a tag 280.1, an index 280.2, and a block offset 280.3. The block offset 280.3, having the least significant bits of the address 280, provides an offset, pointing to the location in the data block where data to be accessed is stored. The index 280.2 specifies the set of data blocks where the memory section could be stored in the cache, e.g., index 0 (of upper-level cache 210) specifies the set including data blocks 215.1, 220.1, 225.1, and 230.1. The tag 280.1, having the most significant bits of the address 280, is used to associate a memory section with a data block in the set. Hence, when a memory section is stored in a certain data block, the tag of the memory section is saved as a metadata of the data block. That way, when the memory section is later re-referenced, the tag of the memory section's address can be compared with tags associated with each data block in the set that is specified by the index of the memory section's address. If no such tag can be found in the set, one of the data blocks in the set has to be replaced (to be evicted)—that is, the memory section is copied into the memory location of the evicted data block, replacing its content with the content of the memory section and updating the tag with the tag of the memory section's address.

When several caches are arranged in a cache hierarchy 200, an evicted data block 240, evicted from the upper-level cache 210, can be offered, together with its associated metadata 245, to a cache at a lower-level of the cache hierarchy, e.g., the lower-level cache 250. The controller of the lower-level cache can then consider, according to insertion policies it maintains and based on the metadata of the evicted data block 245, whether to insert the evicted data block 240 into the cache.

The metadata associated with a data block can include: an address tag, an RRIP value, a validity bit, a coherence state, a reused bit, and a request class. The address tag (e.g., including a tag and an index), as explained above, associates the data block with a memory section from the main memory, which content the data block stores. The RRIP value can be the one assigned by the upper-level cache's replacement algorithm. The validity bit, for example, indicates whether or not the data block is storing valid data. The coherence state indicates whether the main memory is not updated with a change that was made to the content of the data block since the data block had been loaded from the main memory. The reused bit is typically reset to zero when the content of the data block is first inserted into the cache, and, then, set to one when the data block is being re-referenced. Request class can represent information related to the source that requested the insertion of the content of the data block (or can represent the circumstance that brought the content of the data block into the cache). Request classes can include, for example, an instruction-fetch, a demand-load, a store, a translation lookaside buffer (TLB) tablewalk, a particular hardware-prefetcher, a particular type of software-prefetch, a locked instruction, a user-mode instruction, or a supervisor-mode instruction. Hence, the controller of a victim-filled cache, such as the lower-level cache 250 of FIG. 2, can use the evicted data block's metadata to decide whether to insert the data block to the cache 250.

Figure 3:
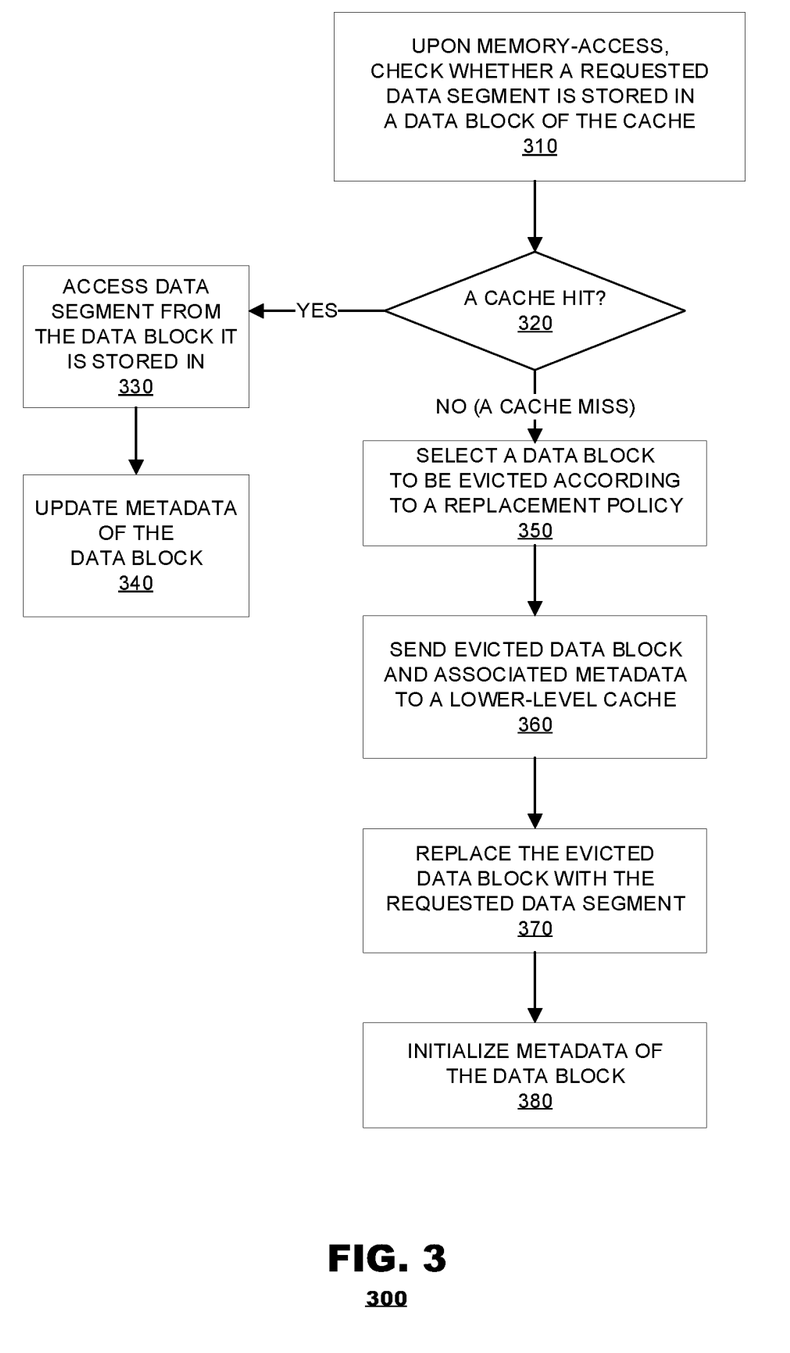
FIG. 3 is a flow diagram of an example operation of an upper-level cache controller, based on which one or more features of the disclosure can be implemented.

FIG. 3 is a flow diagram of an example operation of an upper-level cache controller 300, based on which one or more features of the disclosure can be implemented. When a processor executes an instruction that involves a memory access (e.g., a memory-read or a memory-write), in step 310, the cache is checked to see whether a data segment to be accessed (i.e., the requested data segment) is already stored in a data block of the cache. Checking to see whether a requested data segment is already stored in a data block of the cache can be done, for example, as described above with reference to FIG. 2. If the requested data segment is already stored in a data block of the cache, a cache hit has occurred 320, and, thus, in step 330, the data segment can be read from the data block it is stored in. Following a re-reference for a data block 330, the metadata associated with the data block can be updated in step 340. For example, the reused bit can be set to one when the data block is re-referenced. In another example, the RRIP value associated with the data block can be updated according to a hit promotion policy that is used by the cache controller 300.

If the requested data segment is not stored in the cache, a cache miss has occurred 320, and, thus, one of the data blocks of the cache has to be selected for eviction, in step 350, in accordance with a replacement policy used by the cache controller 300. For example, a cache that applies an RRIP framework for its cache replacement policy assigns an RRIP value to each data block in the cache. Hence, an M-bit RRIP value can be assigned to each data block, where a zero RRIP value indicates that a data block is predicted to be re-referenced in the near-immediate future while a $2_M-1$ RRIP value indicates that a data block is predicted to be re-referenced in the distant future. For example, in a case where M=2, four RRIP values are possible: [0, 1, 2, 3]; the lower the RRIP value is, the sooner the respective data block is predicted to be re-referenced. A replacement algorithm can then select, in step 350, to replace a data block with a maximum RRIP value.

After a data block has been selected for eviction based on the replacement policy employed by the cache controller 300, the evicted data block and its associated metadata can be sent to a lower-level cache 250, in step 360. In addition, the requested data segment is fetched from the main memory and is copied into the memory location in the cache of the data block that has been selected for eviction, in step 370. Then, in step 380, the metadata associated with the data block that stores the requested data segment can be updated. For example, the tag of the data block is updated with the tag part of the data segment's address in the main memory. Next, as described with reference to FIG. 4, the controller of the lower-level cache 250, upon receiving of the evicted data block and its associated metadata from the controller of the upper-level cache 210, has to decide whether to insert the evicted data block or to send it and its associated metadata to the controller of the next-level cache in the cache hierarchy.

Figure 4:
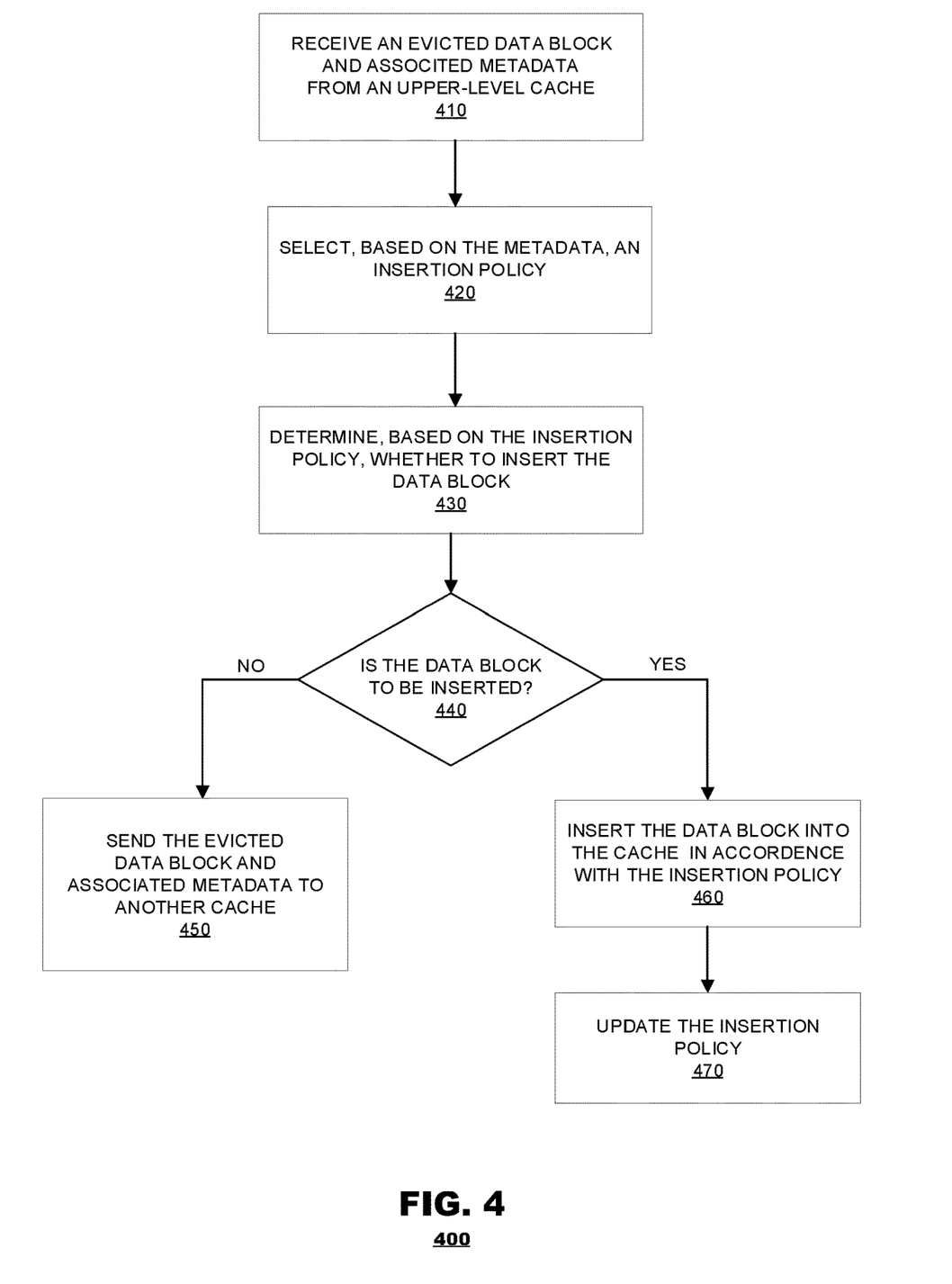
FIG. 4 is a flow diagram of an example operation of a lower-level cache controller, based on which one or more features of the disclosure can be implemented.

FIG. 4 is a flow diagram of an example operation of a lower-level cache controller 400, based on which one or more features of the disclosure can be implemented. As mentioned above, in step 410, the controller of a lower-level cache 250 can receive an evicted data block and its associated metadata from an upper-level cache 210. The controller 400 can then select, in step 420, based on the metadata, an insertion policy. Then, the controller 400 can determine, based on the selected insertion policy, whether to insert the data block into the cache, in step 430. If a decision to not insert the data block has been made 440, in step 450, the evicted data block and its associated metadata are sent to a next-level cache, down in the cache hierarchy, or is evicted to memory if we are at the last level of the hierarchy. If a decision to insert the data block has been made 440, the evicted data block can be inserted into the cache 250, in accordance with the insertion policy, in step 460, possibly, replacing another data block in the cache in accordance with the replacement policy used by the controller of the cache 250. The insertion policy can be next updated in step 470, as described in detail below.

The insertion policies of a victim-filled cache 250 can be pre-determined statistically, for example, by employing a performance simulator. An insertion policy lookup table (e.g., Table 1) can be hardwired into the system 100, or can be implemented in a programmable fashion. Simulations can model various policies on various workloads deemed important and can determine the best overall policy to optimize hit ratio (or other cache performance metrics). If the insertion policy lookup table is programmable, a user or a vendor can experiment to determine the best policy for their specific workloads. The policy that is determined to be the best by cache performance simulations or by experimentation can be applied, for example, by method 400, using the lookup table as described below, during the lifetime of the system 100.

Insertion policies of a victim-filled cache can be derived from a lookup table that correlates metadata of evicted data blocks with respective insertion policies. The reused bit and the request class, associated with an evicted data block, for example, can suggest how likely the data block is to be re-referenced if it is inserted into the cache 250. For example, a data block with a request class representing a demand load line that has been reused in the evicting cache 210 may have a higher likelihood of being hit in the victim-filled cache 250 than data blocks with other request classes. Table 1 provides an example for an insertion policy lookup table. Accordingly, in step 420, the lookup table can be consulted in order to decide what insertion policy to use for given metadata of an evicted data block. As shown in Table , the metadata information regarding the reused bit and the request class can be used to retrieve an insertion policy. For example, based on the data block's metadata, an insertion policy may be used that applies an RRIP replacement policy; in which case a data block may be inserted into the cache with a parameter that indicates high replacement policy strength (e.g., a low RRIP value) or low replacement policy strength (e.g., a high RRIP value). In another example, based on the data block's metadata, an insertion policy may be used that applies an LRU replacement policy; in which case a data block may be inserted into the cache with a parameter that indicates recency (age) value.

Specifically, as shown in Table 1, evicted blocks with a reused bit 0 and a demand-load request class in their metadata, will be inserted into the cache. According to the lookup table, the replacement policy that will be used in this case is an RRIP replacement policy, and, thus, an RRIP value of 0 will be associated with the inserted data block. Likewise, as shown in Table 1, evicted blocks with a reused bit 1 and a demand-load request class in their metadata will be inserted into the cache. According to the lookup table, the replacement policy that will be used in this case is also an RRIP replacement policy, however, an RRIP value of 3 will be associated with the inserted data block. On the other hand, evicted blocks with a reused bit 0 or 1 and a software-prefetch request in their metadata will not be inserted into the cache. In yet another example, evicted blocks with a reused bit 0 or 1 and a user-mode instruction request class in their metadata, will be inserted into the cache. According to the lookup table, the replacement policy that will be used in this case is an LRU replacement policy, and, thus, a recency parameter of value 0 or 1, respectively, will be associated with the inserted data block.

TABLE 1

Insertion policy lookup table.

| Data Block's Metadata | | Insertion Policies | |
|---|---|---|---|
| Reused Bit | Request Class | Policy | Parameter |
| 0 | A demand-load | RRIP | 0 |
| 1 | A demand-load | RRIP | 3 |
| 0 | A hardware-prefetcher | No Insert | N/A |
| 1 | A hardware-prefetcher | RRIP | 3 |
| 0 | A software-prefetch | No Insert | N/A |
| 1 | A software-prefetch | No Insert | N/A |
| 0 | A user-mode instruction | LRU | 0 |
| ... | ... | | ... |
| ... | ... | | ... |
| ... | ... | | ... |
| 1 | A user-mode instruction | LRU | 1 |
| 1 | Another request class | RRIP | 1 |

Table 1 can be updated, in step 470, for example, based on statistics derived from information in the metadata of the inserted data blocks. For example, RRIP values, derived from the metadata of data blocks with reused bit 1 and a demand-load request class, can be used to form a statistic for the RRIP value. Such a statistic can be used when inserting future blocks (with reused bit 1 and a demand-load request class) into the cache—the corresponding RRIP parameter in the lookup table (currently of value 3) can be updated by this statistic.

In an alternative, the insertion policies can be dynamically determined. For example, the victim-filled cache 250 can dedicate two test groups, each test group can include a subset of sets (i.e., several indexes in the cache). Both groups correspond to a certain reused bit (0 or 1) and a certain request class, however, each group is assigned with a different insertion policy candidate. The test groups are then used to test their respective insertion policy candidates, and the candidate with the superior policy can then be applied to the cache. For example, an un-reused (reused bit of zero) hardware prefetch request class can have associated with it a strong replacement policy in one group and a weaker replacement policy in the second group. The test groups can then be tracked to see which group is performing better according to a performance metric. A performance metric can be, for example, the number of cache misses. Then, the insertion policy candidate that results in least cache misses can be applied in the remainder of the cache sets (indexes) for the corresponding reused bit and request class (e.g., for the un-reused hardware prefetch in the example above). In an alternative, the tracking of the test groups and the application of the selected insertion policy candidate to the remainder of the cache can be carried out concurrently with the operation of the cache. In another alternative, another mirroring cache can be used for the test groups. In this case, the tracking of the test groups in the mirroring cache and the application of the selected insertion policy candidate to the mirrored cache 250 can be carried out concurrently with the operation of the cache.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of maintaining insertion policies of a lower-level cache, comprising:
   receiving, from an upper-level cache, a data block and associated metadata, wherein the data block was evicted from the upper-level cache and the associated metadata includes a reused bit and a request class;
   selecting, based on the reused bit and the request class, an insertion policy from the insertion policies of the lower-level cache;
   determining, based on the selected insertion policy, whether to insert the data block into the lower-level cache; and
   if it is determined to insert, inserting the data block into the lower-level cache according to the selected insertion policy.

2. The method of claim 1, wherein the selected insertion policy applies a re-reference interval prediction (RRIP) replacement policy, assigning an RRIP value to the inserted data block.

3. The method of claim 1, wherein the selected insertion policy applies a least recently used (LRU) replacement policy, assigning a recency value to the inserted data block.

4. The method of claim 1, further comprising:
if it is determined to insert, updating, based on the associated metadata, the selected insertion policy.

5. The method of claim 1, wherein the lower-level cache is a set associative cache, and the method further comprising:
selecting, based on the reused bit and the request class, a first insertion policy candidate and a second insertion policy candidate from the insertion policies;
determining, based on the first insertion policy candidate, whether to insert the data block into a first group of sets in the lower-level cache, and if it is determined to insert, inserting the data block into the first group according to the first insertion policy candidate;
determining, based on the second insertion policy candidate, whether to insert the data block into a second group of sets in the lower-level cache, and if it is determined to insert, inserting the data block into the second group according to the second insertion policy candidate; and
updating the selected insertion policy based on one of the first or the second candidate policies.

6. The method of claim 5, wherein the updating the selected insertion policy based on one of the first or the second candidate policies comprises:
tracking, based on a performance metric, the performance of the first group and the second group;
selecting, based on the performance of the first group and the second group, a new insertion policy; and
updating the selected insertion policy based on the new insertion policy.

7. The method of claim 5, wherein the updating the selected insertion policy based on one of the first or the second candidate policies comprises:
tracking a number of cache misses that occurred in the first group and the second group; and
if least number of cache misses occurred in the first group, updating the selected insertion policy based on the first insertion policy candidate.

8. A system for maintaining insertion policies of a lower-level cache comprising:
at least one processor; and
memory storing instructions that, when executed by the at least one processor, cause the system to:
receive, from an upper-level cache, a data block and associated metadata, wherein the data block was evicted from the upper-level cache and the associated metadata include a reused bit and a request class,
select, based on the reused bit and the request class, an insertion policy from the insertion policies of the lower-level cache;
determine, based on the selected insertion policy, whether to insert the data block into the lower-level cache; and
if it is determined to insert, insert the data block into the lower-level cache according to the selected insertion policy.

9. The system of claim 8, wherein the selected insertion policy applies an RRIP replacement policy, assigning an RRIP value to the inserted data block.

10. The system of claim 8, wherein the selected insertion policy applies an LRU replacement policy, assigning a recency value to the inserted data block.

11. The system of claim 8, wherein, if it is determined to insert, the instructions further cause the system to:
update, based on the associated metadata, the selected insertion policy.

12. The system of claim 8, wherein the lower-level cache is a set associative cache and wherein the instructions further cause the system to:
select, based on the reused bit and the request class, a first insertion policy candidate and a second insertion policy candidate from the insertion policies;
determine, based on the first insertion policy candidate, whether to insert the data block into a first group of sets in the lower-level cache, and if it is determined to insert, inserting the data block into the first group according to the first insertion policy candidate;
determine, based on the second insertion policy candidate, whether to insert the data block into a second group of sets in the lower-level cache, and if it is determined to insert, inserting the data block into the second group according to the second insertion policy candidate; and
update the selected insertion policy based on one of the first or the second candidate policies.

13. The system of claim 12, wherein the updating the selected insertion policy based on one of the first or the second candidate policies comprises:
tracking, based on a performance metric, the performance of the first group and the second group;
selecting, based on the performance of the first group and the second group, a new insertion policy; and
updating the selected insertion policy based on the new insertion policy.

14. The system of claim 12, wherein the updating the selected insertion policy based on one of the first or the second candidate policies comprises:
tracking a number of cache misses that occurred in the first group and the second group; and
if least number of cache misses occurred in the first group, updating the selected insertion policy based on the first insertion policy candidate.

15. A non-transitory computer-readable medium comprising instructions executable by at least one processor to perform operations for maintaining insertion policies of a lower-level cache, the operations comprising:
receiving, from an upper-level cache, a data block and associated metadata, wherein the data block was evicted from the upper-level cache and the associated metadata include a reused bit and a request class;
selecting, based on the reused bit and the request class, an insertion policy from the insertion policies of the lower-level cache;
determining, based on the selected insertion policy, whether to insert the data block into the lower-level cache; and
if it is determined to insert, inserting the data block into the lower-level cache according to the selected insertion policy.

16. The non-transitory computer-readable medium of claim 15, wherein the selected insertion policy applies an RRIP replacement policy, assigning an RRIP value to the inserted data block.

17. The non-transitory computer-readable medium of claim 15, wherein the selected insertion policy applies an LRU replacement policy, assigning a recency value to the inserted data block.

18. The non-transitory computer-readable medium of claim 15, further comprising:
if it is determined to insert, updating, based on the associated metadata, the selected insertion policy.

19. The non-transitory computer-readable medium of claim 15, wherein the lower-level cache is a set associative cache, and the operations further comprising:
- selecting, based on the reused bit and the request class, a first insertion policy candidate and a second insertion policy candidate from the insertion policies;
- determining, based on the first insertion policy candidate, whether to insert the data block into a first group of sets in the lower-level cache, and if it is determined to insert, inserting the data block into the first group according to the first insertion policy candidate;
- determining, based on the second insertion policy candidate, whether to insert the data block into a second group of sets in the lower-level cache, and if it is determined to insert, inserting the data block into the second group according to the second insertion policy candidate; and
- updating the selected insertion policy based on one of the first or the second candidate policies.

20. The non-transitory computer-readable medium of claim 19, wherein the updating the selected insertion policy based on one of the first or the second candidate policies comprises:
- tracking, based on a performance metric, the performance of the first group and the second group;
- selecting, based on the performance of the first group and the second group, a new insertion policy; and
- updating the selected insertion policy based on the new insertion policy.

21. The non-transitory computer-readable medium of claim 19, wherein the updating the selected insertion policy based on one of the first or the second candidate policies comprises:
- tracking a number of cache misses that occurred in the first group and the second group; and
- if least number of cache misses occurred in the first group, updating the selected insertion policy based on the first insertion policy candidate.

* * * * *